(12) United States Patent  
Sawano

(10) Patent No.: US 8,953,179 B2
(45) Date of Patent: Feb. 10, 2015

(54) PRINTING APPARATUS, METHOD FOR CONTROLLING PRINTING APPARATUS, AND STORAGE MEDIUM

(75) Inventor: Yasuaki Sawano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/380,248

(22) PCT Filed: Jul. 29, 2011

(86) PCT No.: PCT/JP2011/004313
§ 371 (c)(1),
(2), (4) Date: Dec. 22, 2011

(87) PCT Pub. No.: WO2012/020550
PCT Pub. Date: Feb. 16, 2012

(65) Prior Publication Data
US 2012/0182566 A1  Jul. 19, 2012

(30) Foreign Application Priority Data

Aug. 9, 2010  (JP) ................................. 2010-178288

(51) Int. Cl.
*G06K 15/00* (2006.01)
*H04N 1/00* (2006.01)
*B41J 29/38* (2006.01)

(52) U.S. Cl.
CPC ............ *H04N 1/00002* (2013.01); *B41J 29/38* (2013.01); *H04N 1/00015* (2013.01); *H04N 1/00023* (2013.01); *H04N 1/00037* (2013.01); *H04N 1/00042* (2013.01); *H04N 1/00047* (2013.01); *H04N 1/0005* (2013.01); *H04N 1/00063* (2013.01); *H04N 1/00082* (2013.01); *H04N 1/0057* (2013.01); *H04N 1/00588* (2013.01); *H04N 1/00591* (2013.01); *H04N 1/00602* (2013.01); *H04N 1/00612* (2013.01); *H04N 1/00615* (2013.01); *H04N 1/0062* (2013.01); *H04N 1/00652* (2013.01)
USPC ........................................................ 358/1.12

(58) Field of Classification Search
CPC ............................. B41J 29/38; H04N 1/00002
USPC ................................. 358/1.12, 1.13; 271/3, 9
See application file for complete search history.

(56) References Cited

U.S. PATENT DOCUMENTS 5,156,385 A * 10/1992 Muto et al. ...................... 271/3.2
2010/0053695 A1* 3/2010 Togami .......................... 358/448

FOREIGN PATENT DOCUMENTS

| JP | 9-116654 A | 5/1997 |
| JP | 2005-205693 A | 8/2005 |
| JP | 2006-39464 A | 2/2006 |
| JP | 2006-039464 A | 2/2006 |

(Continued)

*Primary Examiner* — Tammy Pham
*Assistant Examiner* — Bharatkumar Shah
(74) *Attorney, Agent, or Firm* — Canon USA Inc. IP Division

(57) ABSTRACT

When a user sets, through an operation unit, an inspection item of inspection processing which inspects a print state by reading image data by the image reading unit from a sheet output from a printer unit and conveyed by conveyance rollers, an inspection control unit of an inspection unit changes a sheet conveyance speed in the inspection unit and sheet feeding timing according to the inspection item. A print medium conveyance control unit controls drive of conveyance rollers according to the sheet conveyance speed and the sheet feeding timing.

13 Claims, 7 Drawing Sheets

(56) References Cited

FOREIGN PATENT DOCUMENTS

| JP | 2006-094090 A | 4/2006 |
| JP | 2006-137075 A | 6/2006 |
| JP | 2006-231693 A | 9/2006 |
| JP | 2008-236177 A | 10/2008 |
| JP | 2009-230046 A | 10/2009 |
| JP | 2010-041430 A | 2/2010 |

* cited by examiner

ABC

ABC
↑
INK DROP
MARK

Fig. 11

| INSPECTION MODE | COLOR MODE | READING RESOLUTION | INSPECTION PROCESSING TIME |
|---|---|---|---|
| VDP CHARACTER | MONOCHROME | 600dpi | 1.0 SEC |
| VDP CHARACTER | COLOR | 600dpi | 4.0 SEC |
| STAIN | MONOCHROME | 300dpi | 0.2 SEC |
| STAIN | COLOR | 300dpi | 0.8 SEC |
| DENSITY UNEVENNESS | MONOCHROME | 150dpi | 0.05 SEC |
| DENSITY UNEVENNESS | COLOR | 150dpi | 0.2 SEC |

PRINTING APPARATUS, METHOD FOR CONTROLLING PRINTING APPARATUS, AND STORAGE MEDIUM

CROSS REFERENCE TO RELATED APPLICATIONS

This application is a National Stage filing of PCT Application No. PCT/JP2011/004313 filed on Jul. 29, 2011, which claims priority from Japanese Patent Application No. 2010-178288 filed Aug. 9, 2010, the disclosures of each of which are hereby incorporated by reference herein in their entirety.

TECHNICAL FIELD

The present invention relates to a printing apparatus, a method for controlling the printing apparatus, and a storage medium.

BACKGROUND ART

Conventionally, there has been known an image processing apparatus (printing apparatus) provided with an inspection unit for inspecting a result of image printing performed by the printing unit. The inspection unit includes an image reading unit for acquiring an image printed on a sheet being conveyed along a conveyance path as inspection image data.

Then, the inspection unit determines whether the print result is good or bad (existence or absence of a print failure) based on the inspection image data acquired by the image reading unit. This arrangement enables a print result to be automatically determined, and thereby enables a corrective action such as reprinting to be automatically performed if the print result indicates a print failure. As a result, the reliability of the image processing apparatus can be further improved.

Whether a print result is good or bad is determined based on the inspection image data, as mentioned above. Therefore, the inspection accuracy of a print result is largely affected by the quality of inspection image data. Accordingly, high-quality inspection image data should be acquired to realize inspection of the print result with higher accuracy.

One possible measure for acquiring high-quality inspection image data is to control a sheet conveyance speed. There is PTL1 as a conventional art addressing it. PTL1 discusses a technique of detecting a sheet conveyance speed to set scanning timing according to the detected conveyance speed.

CITATION LIST

Patent Literature

PTL 1: Japanese Patent Application Laid-Open No. 2006-094090

SUMMARY OF INVENTION

Technical Problem

However, as mentioned above, the technique discussed in PTL1 controls the reading speed at an image reading unit by detecting a sheet conveyance speed, thereby enabling acquisition of high-quality inspection image data even when the sheet conveyance speed changes. However, the technique discussed in PTL1 cannot control the sheet conveyance speed, the print speed, and the sheet feeding timing in the image processing apparatus.

On the other hand, the processing of inspecting a print product requires different kinds of resolution of inspection image data for respective inspection items. Therefore, depending on the set inspection item, it may be impossible to acquire inspection image data at the resolution corresponding to that inspection item, resulting in failure of correct inspection processing.

Solution to Problem

The present invention has been contrived to solve the above-described problems. The present invention is directed to a mechanism capable of controlling the speed of conveying a sheet to an inspection unit and the timing of feeding a sheet according to the content of inspection processing to achieve appropriate inspection processing.

According to an aspect of the present invention, a printing apparatus includes a printing unit configured to perform print processing on a fed sheet based on first image data, a conveyance unit configured to convey the sheet to an inspection unit configured to perform inspection processing based on second image data generated by reading the sheet on which the print processing is performed, and the first image data, and a control unit configured to control timing of feeding the sheet based on a processing time required to perform the inspection processing.

According to another aspect of the present invention, a printing apparatus includes a printing unit configured to perform print processing on a fed sheet based on first image data, a conveyance unit configured to convey the sheet to an inspection unit configured to perform inspection processing for inspecting the sheet based on second image data generated by reading the sheet on which the print processing is performed, and the first image data, and a control unit configured to control timing of feeding the sheet based on an inspection item regarding the inspection processing.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 11 is a table illustrating reading resolution and a time required to inspect a print product of one sheet for each selection of respective modes (each combination of an inspection mode and a color mode).

DESCRIPTION OF EMBODIMENTS

Various exemplary embodiments, features, and aspects of the invention will be described in detail below with reference to the drawings.

EXAMPLE 1

Figure 1:
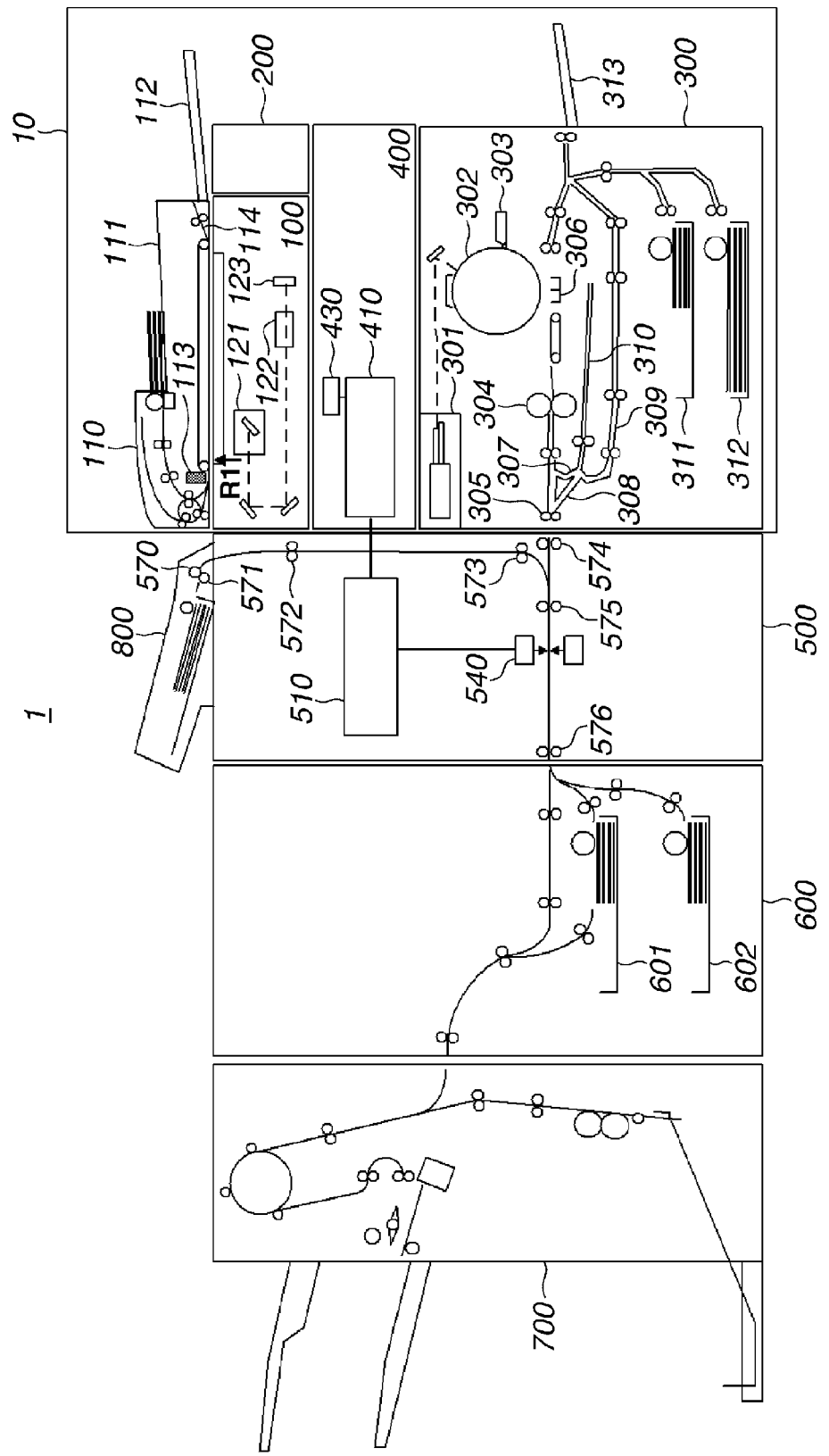
FIG. 1 illustrates a configuration of an inspection system to which a printing apparatus according to an exemplary embodiment of the present invention is applicable

FIG. 1 illustrates a configuration of an inspection system to which a printing apparatus according to an exemplary embodiment of the present invention is applicable.

FIG. 1 illustrates the inspection system 1 as the printing apparatus (image forming apparatus) according to the present exemplary embodiment. The inspection system 1 includes an image processing apparatus 10 including an image reading unit 100, an operation unit 200, a printer unit (printing unit) 300, and a controller unit 400. The inspection system 1 further includes an inspection unit 500, a stacker unit 600, a sheet discharge unit (finisher) 700, and an inserter unit 800.

A document conveyance apparatus 110 of the image reading unit 100 conveys documents set on a document tray 111 one by one from the first page, and transfers the documents onto a document positioning glass plate 114 via a curved path.

In the following, a document reading method performed by the image reading unit 100 will be described. There are two kinds of methods as the method by which the image reading unit 100 reads a one-sided document. The first method is a document fixed-reading mode in which a document is conveyed and stopped when the rear end of the document reaches a reading position R1 on the document positioning glass plate 114, and then is read by a scanner unit 121 moving from the left to the right in FIG. 1.

The second method is a document conveyed-reading mode in which a document is conveyed to the reading position R1 while keeping a constant reading speed, and is read by the scanner unit 121 fixed at the reading position R1. These two methods for reading a one-sided document discharge the read document onto a sheet discharge tray 112.

As a method by which the image reading unit 100 reads a two-sided document, there is a method of reading the front surface of the document by the scanner unit 121 and reading the back surface of the document with use of an optical unit 113 disposed in the document conveyance apparatus 110. The optical unit 113 includes, for example, an image sensor and light source (not illustrated) disposed therein.

An image of a document read by an image sensor 123 via a lens 122 undergoes image processing and is stored in a storage unit 430 in the controller unit 400, and at the same time, is transmitted to an exposure control unit 301 of the printer unit 300 via the controller unit 400.

Similarly, an image of a two-sided document read by the optical unit 113 also undergoes image processing and is stored in the storage unit 430, and at the same time, is transmitted to the exposure control unit 301 of the printer unit 300 via the controller unit 400.

The exposure control unit 301 outputs laser light according to an image signal. Projection of this laser light to a photosensitive drum 302 causes an electrostatic latent image to be formed on the photosensitive drum 302. The electrostatic latent image formed on the photosensitive drum 302 is developed by a development unit 303.

Then, a developer on the photosensitive drum 302 is transferred onto a recording medium (sheet), which is fed from any of cassettes 311 and 312 and a manual paper feeding unit 313, at the transfer unit 306.

The sheet with the developer being transferred thereon is guided to a fixing unit 304, which then fixes the developer. After the sheet has passed through the fixing unit 304, the printer unit 300 first guides the sheet from a path 307 to a path 310 by a flapper (not illustrated). Then, after the rear end of the sheet exits the path 307, the printer unit 300 causes switch-back of the sheet to guide the sheet from a path 308 to a discharge roller 305.

As a result, the sheet can be discharged from the printer unit 300 by the discharge roller 305 with the surface bearing the developer transferred thereon being turned back (facedown). This operation is referred to as "inversed discharge". Discharging a sheet facedown in this way enables image formation from the first page in the correct order according to the page number, for example, during printing images read from a plurality of documents with use of the document conveyance apparatus 110.

For image formation on a rigid sheet such as an overhead projector (OHP) sheet fed from the manual paper feeding unit 313, the printer unit 300 does not guide the sheet to the path 307, and discharges the sheet from the discharge roller 305 with the surface bearing a developer being transferred thereon staying turned up (face up).

Further, for image formation on both sides of a sheet, the printer unit 300 guides the sheet from the fixing unit 304 to the paths 307 and 310. Then, immediately after the rear end of the sheet exits the path 307, the printer unit 300 causes switchback of the sheet, and then guides the sheet to a two-sided conveyance path 309 by a flapper (not illustrated). The transfer unit 306 transfers again an electrostatic latent image on the sheet guided to the two-sided conveyance path 309, and the fixing unit 304 applies the fixing processing to the sheet.

In this way, the lengths of the paths, the arrangement of the rollers, and the division of the driving system are set so as to enable sheet conveyance even when five half-size sheets such as A4 and B5 sheets enter the path of one cycle in which the sheets start from the transfer unit 306 and return to the transfer unit 306 again via the two-sided conveyance path 309.

The page order in which sheets are discharged by these kinds of processing is arranged so that odd-numbered pages are discharged face down, whereby, when two-sided copying is performed, the page order is kept correctly. A print output discharged from the discharge roller 305 is transferred to the inspection unit 500.

In the inspection unit 500, conveyance rollers 574 to 576 convey the print output (sheet) printed at the printer unit 300. An image reading unit 540 reads, as image data, an image on the printed surface of the sheet (the print output printed at the printer unit 300) which is being conveyed by the conveyance rollers 574 to 576.

The image data (print product read data) read by the image reading unit 540 is transferred to an inspection control unit 510 to be inspected page by page. The inspection processing inspects a state of the print processing applied to the sheet with use of the above-described print product read data under the control of the inspection control unit 510.

The print output, from which the image data is read, is transferred to the stacker unit 600. Then, the print output is transferred to the sheet discharge unit 700 without any additional processing applied thereto, or transferred to an all-correct (OK) tray 601 or a no-good (NG) tray 602 according to the inspection result by the inspection control unit 510.

The print output transferred to the OK tray 601 is discharged to the sheet discharge unit 700 after all jobs are completed, or is discharged to the sheet discharge unit 700 each time one set of documents is printed, which a user can select through the operation unit 200.

The print output transferred from the stacker unit 600 to the sheet discharge unit 700 is discharged after being subjected to finishing processing such as cutting processing, binding processing, punching processing, and folding processing that a user sets through the operation unit 200. A document sheet set at the inserter unit 800 is transferred to the inspection unit 500, and is discharged on the sheet discharge tray according to the above-mentioned sheet path.

Figure 2:
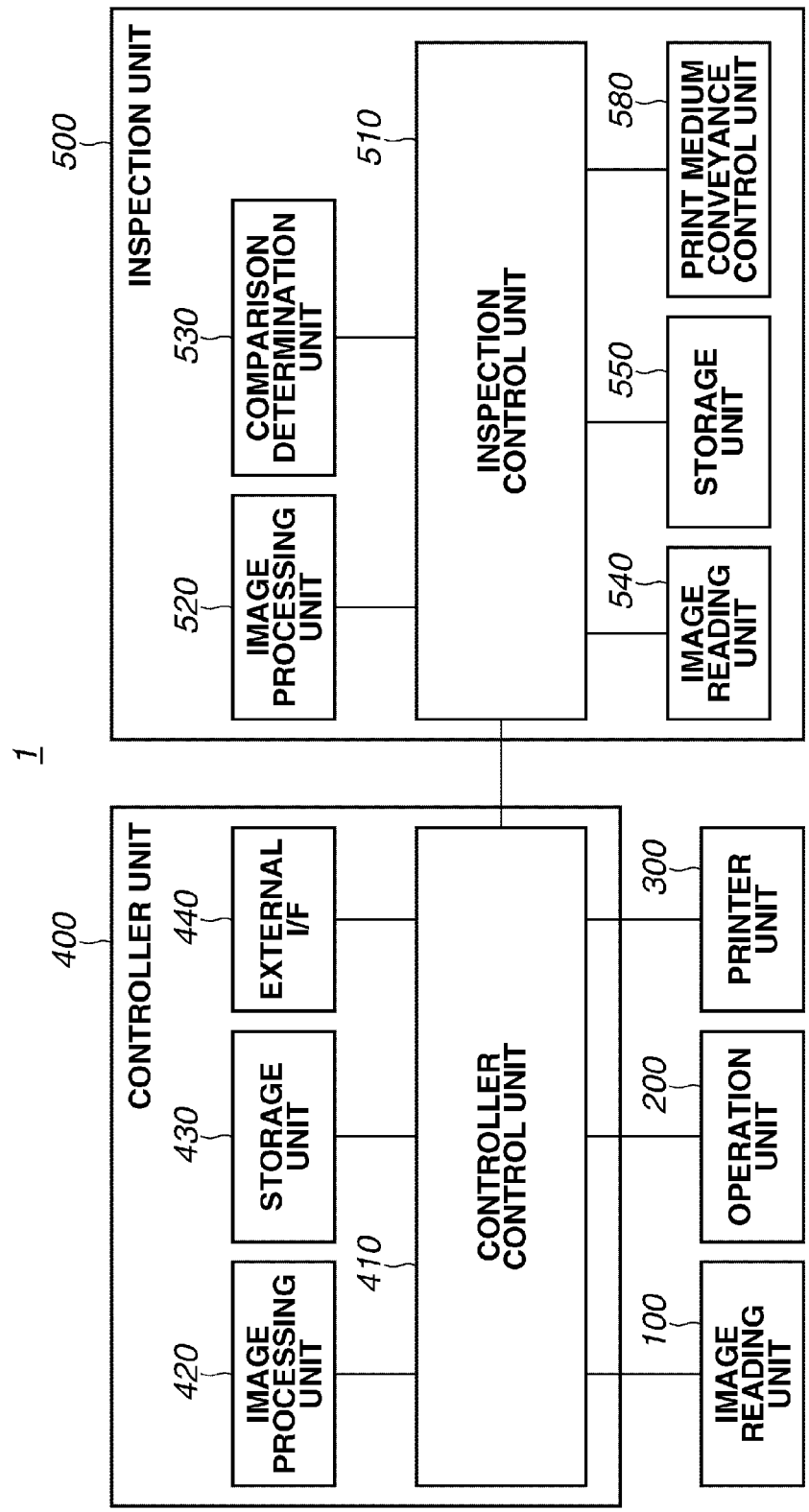
FIG. 2 illustrates an overview of an example control configuration of an inspection system 1.

FIG. 2 illustrates an overview of an example control configuration of the inspection system 1.

The image reading unit 100 reads a document to computerize it, and then transmits the data to a controller control unit 410. The operation unit 200 includes a display unit equipped with a touch panel, and hard keys. A user can specify various settings of the image processing apparatus 10 and operate the image processing apparatus 10, and specify settings related to an inspection by touching an operation screen displayed on the display unit of the operation unit 200 or operating the hard keys.

The printer unit 300 prints data read by the image reading unit 100, data stored in the storage unit 430, or data received by an external interface (I/F) 440 onto a sheet.

The controller unit 400 includes the controller control unit 410, an image processing unit 420, the storage unit 430, and the external I/F 440. The controller control unit 410 is connected to the image reading unit 100, the operation unit 200, the printer unit 300, the inspection unit 500, the image processing unit 420, the storage unit 430, and the external I/F 440. The controller unit 400 controls various kinds of data.

The image processing unit 420 applies image processing to data read by the image reading unit 100 and data received by the external I/F 440 for enabling transmission of the data to the printer unit 300, and then transmits the data to the controller control unit 410.

Further, the image processing unit 420 applies image processing to data read by the image reading unit 100 and image data received from the external I/F 440, and stores it as reference data (first image data) in the storage unit 430. This reference data is constituted by a plurality of pages, if it is based on a job involving a plurality of pages.

The storage unit 430 stores, for example, data read by the image reading unit 100, data received by the external I/F 440, and the settings for use in the inspection system 1 (settings related to an inspection). The external I/F 440 is connected to a personal computer (PC) and an image transmission apparatus via, for example, a universal serial bus (USB) cable, a public line, or a network, and can transmit and receive image data or other data.

The inspection unit 500 includes an inspection control unit 510, an image processing unit 520, a comparison determination unit 530, an image reading unit 540, a storage unit 550, and a print medium conveyance control unit 580. The inspection control unit 510 is connected to the image processing unit 520, the comparison determination unit 530, the image reading unit 540, the storage unit 550, the print medium conveyance control unit 580, and the controller control unit 410.

The inspection control unit 510 receives, for example, reference data and the settings related to the inspection from the controller control unit 410, and stores the received data in the storage unit 550. The image reading unit 540 reads a sheet (print product) printed by the printer unit 300, and transmits the read data (print product read data) to the inspection control unit 510.

The image processing unit 520 applies image processing to the print product read data read by the image reading unit 540 so as to enable it to be compared with the above-described reference data.

The comparison determination unit 530 compares the print product read data (second image data) read by the image reading unit 540 with the reference data (first image data), according to the settings related to the inspection which is received from the controller control unit 410. Then, the comparison determination unit 530 determines whether the inspection result is OK (print success) or NG (print failure) based on the comparison result.

At this time, the inspection control unit 510 counts the page number of the print media read by the image reading unit 540, acquires the reference data from the storage unit 430 according to the page number, and then transmits it to the comparison determination unit 503.

The storage unit 550 stores, for example, reference data received from the controller control unit 410, image data (print product read data) read by the image reading unit 540, and the settings related to the inspection. The print medium conveyance control unit 580 controls the print medium conveyance speed according to the settings related to an inspection stored in the storage unit 550.

Figure 3:
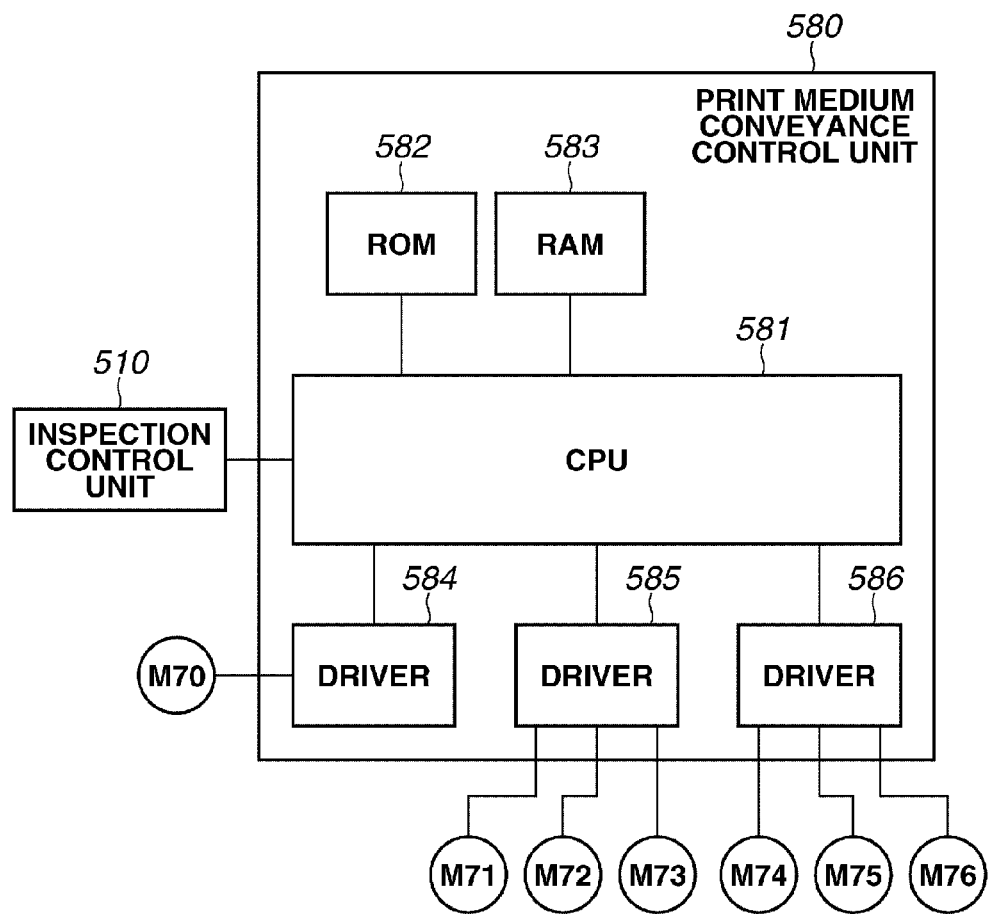
FIG. 3 is a block diagram illustrating a configuration of a print medium conveyance control unit 580.

FIG. 3 is a block diagram illustrating a configuration of the print medium conveyance control unit 580.

As illustrated in FIG. 3, the print medium conveyance control unit 580 includes a central processing unit (CPU) 581, a read only memory (ROM) 582, a random access memory (RAM) 583, and drivers 584 to 586. The CPU 581 develops a program, which is stored in the ROM 582 in a computer readable manner, into the RAM 583, and executes it, thereby controlling drive of the print medium conveyance control unit 580. Further, the CPU 581 communicates with the inspection control unit 510, and stores information about the various settings into the RAM 583.

The CPU 581 drives motors M70 to M76 through the drivers 584 to 586. The motor M70 is connected to the driver 584. The driver 584 drives the motor M70 for inserting a print medium placed on the inserter unit 800 among print media printed by the image processing apparatus 10. Driving the motor M70 causes a rotation of a sheet feeding roller 570 (FIG. 1) to feed a print medium.

The motors M71 to M73 are connected to the driver 585. The driver 585 drives the motors M71 to M73 for conveying the print medium fed by the motor M70 driven by the driver 584. Driving the motors M71 to M73 causes rotations of conveyance rollers 571 to 573 to convey the print medium.

The motors M74 to M76 are connected to the driver 586. The driver 586 drives the motors M74 to M76 for conveying a print medium conveyed from the printer unit 300 or the inserter unit 800 to the stacker unit 600. Driving the motors M74 to M76 causes rotations of the conveyance rollers 574 to 576 to convey the print medium.

Figures 4, 5, 6:
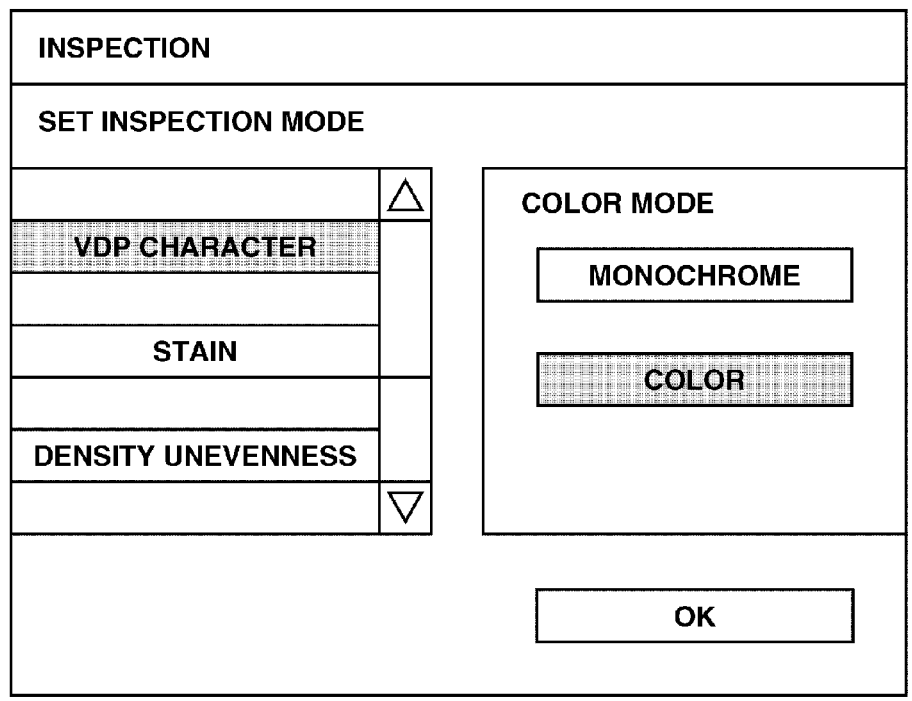
FIG. 4 illustrates an example of a screen displayed on a display unit of an operation unit 200 when inspection settings are performed.
FIG. 5 illustrates a reference image without any stain thereon.
FIG. 6 illustrates an example of an ink drop mark to be inspected in a "stain" mode when the data illustrated in FIG. 5 is printed.

FIG. 4 illustrates an example of a screen displayed on the display unit of the operation unit 200 when a user specifies the inspection settings.

As illustrated in FIG. 4, the screen of the operation unit 200 when a user specifies the inspection settings shows a screen for selecting "inspection mode" and "color mode" as the inspection items related to the inspection. On this screen, the selected modes are highlighted. In FIG. 4, a "VDP character" mode is selected as the inspection mode, and a "color" mode is selected as the color mode.

Now, the inspection mode according to the present exemplary embodiment will be described. The inspection modes employed in the present exemplary embodiment include, but not limited to, three kinds of modes, i.e., the "VDP character" mode, a "stain" mode, and a "density unevenness" mode. "VDP character", "stain", and "density unevenness" indicate a target to be inspected in the respective inspection modes.

First, the inspection mode will be described, starting from the "VDP character" mode. "VDP" stands for "Variable Data Publishing", and indicates personalized publishing which enables generation of a print product handling different kinds of print targets.

Examples of personalized publishing include printing of direct mail which requires printing data having different kinds of contents such as a postcode and an address. The "VDP character" mode inspects whether these printed contents are consistent with intended contents.

Next, the "stain mode" will be described. The "stain" mode is a mode for inspecting whether a print product contains an unintended image such as a drop mark of a printing agent such as toner, a white spot, and a streak. Now, this mode will be concretely described with reference to FIGS. 5 to 8.

Figure 7:
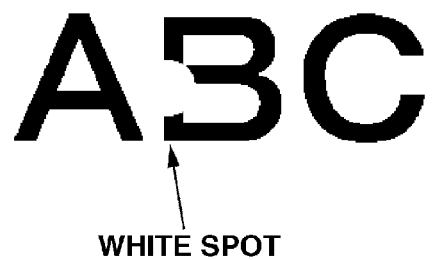
FIG. 7 illustrates an example of a white spot to be inspected in the "stain" mode when the data illustrated in FIG. 5 is printed.

FIG. 5 illustrates a reference image without any stain thereon. FIG. 6 illustrates an example of an ink drop mark to be inspected in the "stain" mode when the data illustrated in FIG. 5 is printed. FIG. 7 illustrates an example of a white spot to be inspected in the "stain" mode when the data illustrated in FIG. 5 is printed.

Figure 8:
FIG. 8 illustrates an example of a streak to be inspected in the "stain" mode when the data illustrated in FIG. 5 is printed.

FIG. 8 illustrates an example of a streak to be inspected in the "stain" mode when the data illustrated in FIG. 5 is printed. Lastly, the "density unevenness" mode will be described. The "density unevenness" mode is a mode for inspecting whether portions having a same degree of density are output with a same degree of density in a print product. Now, this mode will be concretely described with reference to FIGS. 9 and 10.

Figure 9:
FIG. 9 illustrates the reference image without density unevenness.
Figure 10:
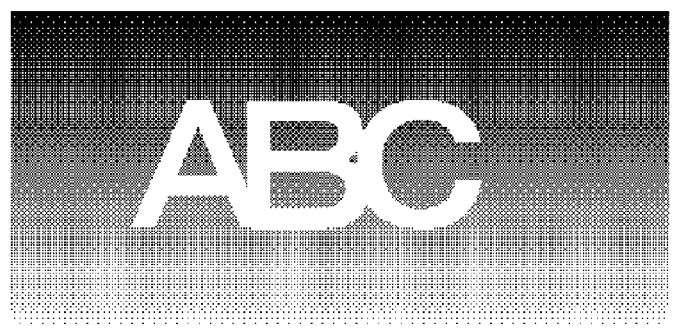
FIG. 10 illustrates an example of density unevenness to be inspected in a "density unevenness" mode when the data illustrated in FIG. 9 is printed.

FIG. 9 illustrates a reference image without density unevenness. FIG. 10 illustrates an example of density unevenness to be inspected in the "density unevenness" mode when the data illustrated in FIG. 9 is printed.

Next, the color mode will be described. There are two kinds of color modes as the color mode, i.e., a "monochrome" mode and a "color" mode. The "monochrome" mode is a mode for an inspection with use of image data read in 8-bit gray scale.

On the other hand, the "color mode" is a mode for an inspection with use of image data read in RGB each in 8-bit. FIG. 11 illustrates the reading resolution and the time required to inspect a print product of one sheet corresponding to each selection of these modes.

More specifically, FIG. 11 is a table illustrating the reading resolution and the time required to inspect a print product of one sheet for each selection of specific inspection items (combinations of a specific inspection mode and a specific color mode).

This table is stored in advance in the storage unit 550 in the inspection unit 500 illustrated in FIG. 2. Further, the information that a user sets through the operation unit 200 is informed to the inspection control unit 510 through the controller control unit 410 in the controller unit 400, and is stored in the storage unit 550.

In the example illustrated in FIG. 11, for example, when the "VDP character" mode is set as the inspection mode, and the "monochrome" mode is set as the color mode, the reading resolution is "6000 dots per inch (dpi)" and the inspection processing time per sheet (inspection time) is "1.0 second".

In the present exemplary embodiment, it is assumed that the print speed of the printer unit 300 in the image processing apparatus 10 in the inspection system 1 is "120 pages per minute (ppm)" for both color printing and monochrome printing. In other words, the printer unit 300 outputs one printed sheet every "0.5 second" when the printer unit 300 continuously prints a plurality of sheets.

Therefore, the print output interval (sheet feeding timing) of the printer unit 300 is "0.5 second". Further, it is assumed that the reading speed of the image reading unit 54 in the inspection unit 500 is "60 images per minute (ipm)" for reading "600 dpi" resolution, "120 ipm" for reading "300 dpi" resolution, and "240 ipm" for reading "150 dpi" resolution, regardless of whether the image is colored or monochrome. In other words, the time that the image reading unit 540 takes to read one sheet is "1 second" for "600 dpi" resolution, "0.5 seconds" for "300 dpi" resolution, and "0.25 seconds" for "150 dpi" resolution. As is known in the art, "ppm" stands for "page per minute", and indicates the number of printed pages per minute, and "ipm" stands for "image per minute", and indicates the number of input images per minute.

As illustrated in FIG. 11, in the present exemplary embodiment, the inspection unit 500 is configured to change the sheet reading resolution of the image reading unit 540 depending on the selected inspection item. This is because the inspection processing requires different kinds of image data resolution depending on the inspection item.

In this way, the sheet reading resolution of the image reading unit 540, and the size of read image data vary depending on the inspection item, whereby a load imposed on the inspection unit 500 due to the inspection processing varies depending on the inspection item, and thereby the inspection processing time also varies depending on the inspection item.

The print speed of the above-described printer unit 300 and the reading speed of the image reading unit 540 for each reading resolution are stored in the storage unit 550 in the inspection unit 500 illustrated in FIG. 2 in advance.

Alternatively, the inspection system 1 may be configured in such a manner that the print speed of the printer unit 300 is acquired by the inspection control unit 510 in the inspection unit 500 from the controller control unit 410 of the controller unit 400 to be stored in the storage unit 550.

Figure 12:
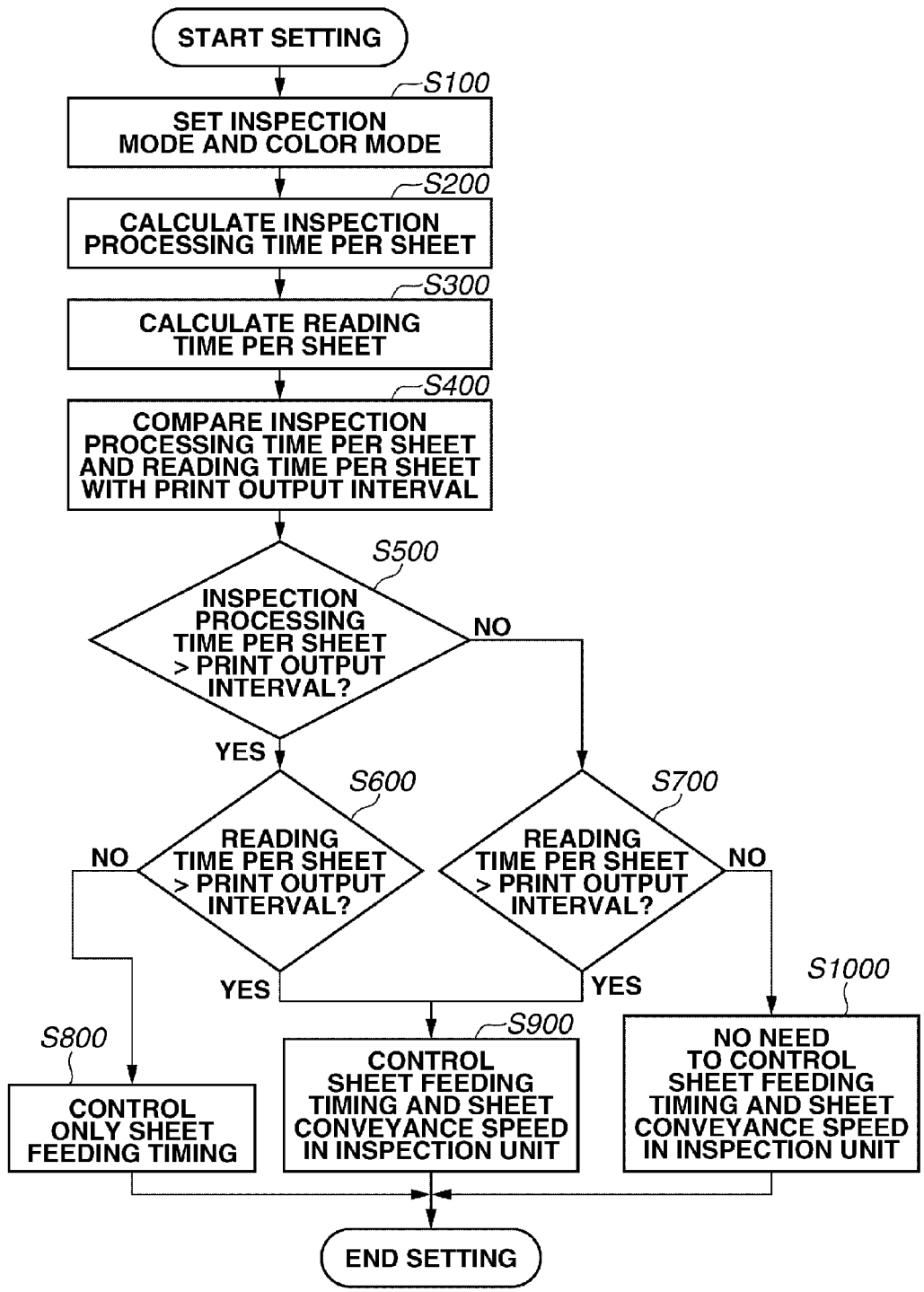
FIG. 12 is a flowchart illustrating an example of processing of setting sheet feeding timing and a sheet conveyance speed in the image forming apparatus according to an exemplary embodiment of the present invention.

The processing flow performed in the inspection system 1 as mentioned above will be described with reference to FIG. 12. FIG. 12 is a flowchart illustrating an example of processing for setting the sheet feeding timing and the sheet conveyance speed in the image forming apparatus according to the present exemplary embodiment.

First, when a start of specifying the settings related to an inspection (the settings of the inspection item of inspection processing to be performed by the inspection unit 500) is instructed through the operation unit 200, in step S100, the controller control unit 410 displays the screen illustrated in FIG. 4 on the display unit of the operation unit 200, and receives the settings of the inspection item related to the inspection.

When the settings of the inspection items (the settings of, for example, the inspection mode and the color mode) are specified through the operation unit 200, the controller control unit 410 notifies the inspection control unit 510 of the information of the settings related to the inspection, and the inspection control unit 510 stores the notified information in the storage unit 550.

Next, in step S200, the inspection control unit 510 calculates the inspection processing time per sheet (the time required to inspect one sheet) based on the settings related to the inspection (the settings of the inspection mode and the color mode) notified from the controller control unit 410 and stored in the storage unit 550.

More specifically, the inspection control unit 510 calculates it by referring to the table illustrated in FIG. 11 stored in the storage unit 550. For example, if the inspection mode is the "stain" mode and the color mode is the "color" mode, the inspection processing time per sheet is "0.8 second" according the table illustrated in FIG. 11.

Next, in step S300, the inspection control unit 510 calculates the reading time per sheet (the time required to read one sheet) based on the settings related to the inspection (the settings of the inspection mode and the color mode) notified from the controller control unit 410 and stored in the storage unit 550. The inspection control unit 510 also calculates (acquires) it by referring to the table illustrated in FIG. 11 stored in the storage unit 550.

For example, if the inspection mode is the "stain" mode and the color mode is the "color" mode, the reading resolution is "300 dpi" according to FIG. 11. As mentioned above, the reading speed is "120 ipm" for reading a "300 dpi" image, and therefore the reading time per sheet is calculated as "0.5 seconds".

Next, in step S400, the inspection control unit 510 compares the inspection processing time per sheet calculated in step S200 as mentioned above, and the reading time required for the image reading unit 540 to read one sheet calculated in step S300 as mentioned above, with the print output interval (the sheet feeding timing) of the printer unit 300. The print output interval of the printer unit 300 is calculated by the inspection control unit 510 from the print speed of the printer unit 300 stored in the storage unit 550.

In step S500, the inspection control unit 510 determines whether the inspection processing time per sheet is longer than the print output interval. For example, if the inspection mode is the "stain" mode and the color mode is the "color" mode, the inspection processing time per sheet is "0.8 seconds" and the print output interval is "0.5 seconds". Therefore, in this case, the inspection control unit 510 determines that the inspection processing time per sheet is longer than the print output interval (YES in step S500), and the processing proceeds to step S600.

Next, in step S600, the inspection control unit 510 determines whether the reading time per sheet is longer than the print output interval. For example, if the inspection mode is the "stain" mode and the color mode is the "color" mode, the reading time per sheet is "0.5 seconds" and the print output interval is "0.5 seconds". Therefore, in this case, the inspection control unit 510 determines that the reading time per sheet is equal to the print output interval (NO in step S600), and the processing proceeds to step S800.

In step S800, the inspection control unit 510 notifies the controller control unit 410 of the necessity to control the print output interval (in the present exemplary embodiment, the timing of feeding a sheet from the sheet feeding unit (the cassette 311, the cassette 312, or the manual sheet feeding unit 313)).

In this case, the inspection processing time per sheet is longer than the print output interval by "0.3 seconds", whereby the inspection control unit 510 notifies the controller control unit 410 so as to slow down the timing of feeding a sheet from the sheet feeding units 311 to 313 of the printer unit 300 by "0.3 seconds" per sheet to increase the print output interval by "0.3 seconds".

In this example, the inspection control unit 510 issues a notification so that the print output interval becomes equal to the inspection processing time per sheet. However, the print output interval may be changed into any print output interval enabling the inspection unit 500 to perform the inspection processing according to the inspection item. For example, the inspection control unit 510 may issue a notification to change the print output interval so that the print output interval becomes longer than the inspection processing time per sheet (longer than the inspection time).

On the other hand, if the inspection mode is the "VDP character" mode and the color mode is the "monochrome" mode, in step S500, the inspection control unit 510 compares "1.0 second" as the inspection processing time per sheet with "0.5 seconds" as the print output interval. Therefore, in this case, the inspection control unit 510 determines that the inspection processing time per sheet is longer than the print output interval (YES in S500), and then the processing proceeds to step S600.

Further, in this case, since the reading time per sheet is "1 second" and the print output interval is "0.5 seconds", the inspection control unit 510 determines that the reading time per sheet is longer than the print output interval (YES in step S600), and then the processing proceeds to step S900.

In step S900, the inspection control unit 510 notifies the controller control unit 410 of the necessity to control the print output interval (the sheet feeding timing in the present exemplary embodiment), and notifies the print medium conveyance control unit 580 of the necessity to control the sheet conveyance speed in the inspection unit 500.

First, the inspection control unit 510 issues a notification to change the print output interval so as to be longer than the inspection processing time per sheet and longer than the reading time per sheet. p In the above-described case, the inspection processing time per sheet (1 second) is longer than the print output interval (0.5 seconds) by "0.5 seconds". Further, the reading time per sheet (1 second) is also longer than the print output interval (0.5 seconds) by "0.5 seconds". Therefore, the inspection control unit 510 notifies the controller control unit 410 of the change to slow down the timing of feeding a sheet from the sheet feeding units 311 to 313 of the printer unit 300 by "0.5 seconds" per sheet to increase the print output interval by "0.5 seconds" so that the print output interval becomes "1 second".

Next, the inspection control unit 510 notifies the print medium conveyance control unit 580 of the change to reduce the sheet conveyance speed so as to be equal to or lower than the speed that is equal to the speed calculated by multiplying the sheet conveyance speed before the change by the ratio of the print output interval before the change for the reading time per sheet (i.e., multiplied by "the print output interval before the change/the reading time per sheet").

In the above-described case, since the print output interval before the change (0.5 seconds) is half (½) the reading time per sheet (1 second), the inspection control unit 510 notifies the print medium conveyance control unit 580 so as to change (reduce) the sheet conveyance speed into a half (½).

In this example, the sheet conveyance speed is changed into the speed multiplied by "the print output interval before the change/the reading time per sheet". However, in a case of "the inspection time per sheet>the reading time per sheet", the sheet conveyance speed may be changed into a speed within the range from the sheet conveyance speed multiplied by "the print output interval before the change/the print output interval after the change", to the sheet conveyance speed multiplied by "the print output interval before the change/the reading time per sheet". In other words, the inspection control unit 510 issues a notification to change the sheet conveyance speed with use of a change multiplying factor equal to or larger than the ratio of the output interval to the inspection time per sheet, and equal to or smaller than the ratio of the output interval to the reading time per sheet.

In this way, the sheet conveyance speed is changed into a speed enabling the image reading unit 540 to read image data at the resolution according to the inspection item.

Further, if the inspection mode is the "density unevenness" mode and the color mode is the "color" mode, in step S500, the inspection control unit 510 compares "0.2 seconds" as the inspection processing time per sheet with "0.5 seconds" as the print output interval. Therefore, in this case, the inspection control unit 510 determines that the inspection processing time per sheet is shorter than the print output interval (NO in S500), and then the processing proceeds to step S700.

In step S700, the inspection control unit 510 determines whether the reading time per sheet is longer than the print output interval. In this case, since the reading time per sheet is "0.25 seconds" and the print output interval is "0.5 seconds", the inspection control unit 510 determines that the reading time per sheet is shorter than the print output interval (NO in step S700). Then, the processing proceeds to step S1000.

In step S1000, the inspection control unit 510 ends the processing of this flowchart without any processing, because the control of the sheet feeding timing does not need to be changed from the normal setting of the printer unit 300, and the sheet conveyance sheet in the inspection unit 500 does not need to be changed from the print speed.

On the other hand, in the above-described step 700, if the inspection control unit 510 determines that the reading time per sheet is longer than the print output interval (YES in step S700), the processing proceeds to step S900. In step S900, the inspection control unit 510 notifies the controller control unit 410 of the necessity to control the print output interval (the sheet feeding timing in the present exemplary embodiment), and at the same time, notifies the print medium conveyance control unit 580 of the necessity to control the sheet conveyance speed in the inspection unit 500.

If the sheet conveyance speed is reduced (YES in step S700) even with the inspection processing time being shorter than the print output interval (NO in S500), the inspection control unit 510 increases the print output interval (the time difference between sheets output continuously discharged from the printer unit 300).

In this example, in the above-described step S800 or S900, the print output interval is changed by changing the timing of feeding a sheet from the sheet feeding units 311 to 313. However, the print output interval may be changed by changing the print speed of the printer unit 300.

After receiving the notification about the change in the sheet feeding timing (or the print speed) in the above-described step S800 or S900, the controller control unit 410 stores the changed sheet feeding timing (or the print speed) in the storage unit 430, and the storage unit 430 holds this data thereafter.

Then, after that, until the settings related to the inspection are reset, the controller control unit 410 controls the printer unit 300 so that the printer unit 300 operates, keeping the above-described changed and notified sheet feeding timing (or the print speed).

Further, after receiving the notification in the above-described step S900, the print medium conveyance control unit 580 stores the notified inspection unit sheet conveyance speed in the storage unit 550, and the storage unit 550 holds this data thereafter. Then, after that, until the settings related to the inspection are reset, the print medium conveyance control unit 580 controls the conveyance system so as to convey a sheet output from the printer unit 300 to the inspection unit 500 at the above-described changed and notified sheet conveyance speed.

In the present exemplary embodiment, when the reading speed is slower than the print speed (the reading time per sheet is longer than the print output interval), the inspection control unit 510 controls the timing of feeding a sheet from the sheet feeding units 311 to 313 in the printer unit 300, according to the sheet conveyance speed in the inspection unit 500. However, the inspection control unit 510 may change the print speed itself, according to the sheet conveyance speed in the inspection unit 500.

As mentioned above, according to the present exemplary embodiment, it is possible to optimally control the print output interval of the printer unit 300 (control, for example, the sheet feeding timing or the print speed), and control the sheet conveyance speed in the inspection unit 500 according to the inspection mode. In other words, the present exemplary embodiment changes the print output interval and the sheet conveyance speed into those enabling the image reading unit 540 to read image data at the resolution according to the inspection item.

The present exemplary embodiment has the "VDP character" mode, the "stain" mode, and the "density unevenness" mode as the inspection mode, but this does not mean that only one of them can be used for an inspection at a time. These modes can be used in any combination of them. Therefore, all of the three modes can be used for an inspection at a time, and in this case, the inspection processing speed is calculated based on the sum of the processing times of the respective modes.

Further, in the present exemplary embodiment, the respective inspection modes are directed to an inspection of a whole sheet surface. However, a region to be inspected may be specified. For example, in the "VDP character" mode, only a portion where an address is written may be set as a region to be inspected, whereby it is possible to reduce the inspection processing time per sheet by a degree corresponding to the area ratio. In this case, the inspection processing time may be deferent from the time indicated in FIG. 11.

As mentioned above, the inspection system 1 calculates the inspection processing time per sheet of the inspection control unit 510 and the reading time per sheet corresponding to the inspection mode based on the inspection mode set through the operation unit 200, and compares the inspection processing time and the reading time with the print output interval of the printer unit 300.

If the print output interval is shorter than the inspection processing time and the reading time of the image reading unit 540, the inspection system 1 changes and controls the sheet conveyance speed in the inspection unit 500, and changes and controls the sheet feeding timing or the print speed of the printer unit 300 of the image processing apparatus 10.

This configuration enables the inspection system 1, which inspects the print result of a sheet printed by the printer unit 300, to change and control the sheet conveyance speed in the inspection unit 500, and the sheet feeding timing or the print speed in the printer unit 300 according to the inspection mode.

As a result, it becomes possible to control the sheet conveyance speed in the inspection unit 500 according to the settings of the inspection item for inspecting a state of print processing applied to a sheet printed by the printer unit 300, thereby enabling a print product to be accurately inspected regardless of the set inspection item.

In the above-described exemplary embodiments, the inspection system 1 is configured to control the sheet conveyance speed in the inspection unit 500 and the print output interval (the sheet feeding timing or the print speed) by comparing the inspection processing time per sheet of the inspection control unit 510 and the reading time of the image reading unit 540 corresponding to the inspection mode with the print output interval of the printer unit 300.

However, the inspection system 1 may be configured to control the sheet conveyance speed in the inspection unit 500 and the print output interval (the sheet feeding timing or the print speed) by comparing the inspection processing speed of the inspection control unit 510 and the reading speed of the image reading unit 540 corresponding to the inspection mode to the print speed of the printer unit 300.

The above-described various kinds of data may have not only the configurations and contents described above, but also any various configurations and contents according to its usage and purpose.

Though a specific exemplary embodiment is described above, the present invention can be embodied as, for example, a system, an apparatus, a method, a program, or a storage medium. More specifically, the present invention may be applied to a system constituted by a plurality of devices, or an apparatus constituted by a single device.

Further, the above-described exemplary embodiments can be used either alone or a combination with one another within the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-178288 filed Aug. 9, 2010, which is hereby incorporated by reference herein in its entirety.

The invention claimed is:

1. A printing system comprising:
a plurality of sheet storing units configured to store sheets;
an acquiring unit configured to acquire printing image data;
a printing unit configured to perform, based on the printing image data acquired by the acquiring unit, print processing on a sheet fed from a sheet storing unit included in the plurality of sheet storing units;
an inspection unit configured to perform inspection processing for determining whether a print failure occurs by comparing the printing image data acquired by the acquiring unit with reading image data generated when reading is performed on the sheet on which the print processing is performed;
an obtaining unit configured to obtain processing time of the inspection processing; and
a changing unit configured to change, based on the processing time obtained by the obtaining unit, timing to feed a sheet from a sheet storing unit included in the plurality of sheet storing units.

2. A printing system comprising:
a plurality of sheet storing units configured to store sheets;
an acquiring unit configured to acquire printing image data;
a printing unit configured to perform, based on the printing image data acquired by the acquiring unit, print processing on a sheet fed from a sheet storing unit included in the plurality of sheet storing units;
an inspection unit configured to perform inspection processing for determining whether a print failure occurs by comparing the printing image data acquired by the acquiring unit with reading image data generated when reading is performed on the sheet on which print processing is performed;
a setting unit configured to set an inspection setting relating to the inspection processing; and
a changing unit configured to change, based on the inspection setting set by the setting unit, timing to feed a sheet from a sheet storing unit included in the plurality of sheet storing units.

3. The printing system according to claim 2, wherein the inspection setting indicates a target of the inspection processing.

4. The printing system according to claim 2, wherein the inspection setting indicates whether the inspection processing is performed in a color mode or a monochrome mode.

5. The printing system according to claim 2, wherein the inspection setting indicates a reading resolution used when the reading unit reads the sheet on which the print processing is performed.

6. A method for controlling a printing apparatus comprising:
storing sheets in a plurality of sheet storing units;
acquiring printing image data;
performing, based on the acquired printing image data, print processing on a sheet fed from a sheet storing unit included in the plurality of sheet storing units;
performing inspection processing for determining whether a print failure occurs by comparing the acquired printing image data with reading image data generated when reading is performed on the sheet on which the print processing is performed;
obtaining processing time of the inspection processing; and
changing, based on the obtained processing time, timing to feed a sheet from a sheet storing unit included in the plurality of sheet storing units.

7. A non-transitory storage medium storing a program for causing a computer to execute the method for controlling the printing apparatus according to claim 6.

8. A method for controlling a printing apparatus comprising:
storing sheets in a plurality of sheet storing units;
acquiring printing image data;

performing, based on the acquired printing image data, print processing on a sheet fed from a sheet storing unit included in the plurality of sheet storing units;

performing inspection processing for determining whether a print failure occurs by comparing the acquired printing image data with reading image data generated when reading is performed on the sheet on which the print processing is performed;

setting an inspection setting relating to the inspection processing; and changing, based on the set inspection setting, timing to feed a sheet from a sheet storing unit included in the plurality of sheet storing units.

9. A non-transitory storage medium storing a program for causing a computer to execute the method for controlling the printing apparatus according to claim 8.

10. The printing system according to claim 2, further comprising:

a displaying unit configured to display an inspection setting screen, wherein the setting unit sets an inspection setting based on a user's specification input via the inspection setting screen.

11. The printing system according to claim 2, wherein the inspection unit performs the inspection processing based on the inspection setting set by the setting unit.

12. The printing system according to claim 1, wherein the acquiring unit acquires the printing image data from an external apparatus on a network.

13. The printing system according to claim 2, wherein the acquiring unit acquires the printing image data from an external apparatus on a network.

* * * * *